US012265829B2

(12) United States Patent
Huang

(10) Patent No.: US 12,265,829 B2
(45) Date of Patent: Apr. 1, 2025

(54) RE-TRIGGERING WAKE-UP TO HANDLE TIME SKEW BETWEEN SCALAR AND VECTOR SIDES

(71) Applicant: SiFive, Inc., San Mateo, CA (US)

(72) Inventor: Kuan Lin Huang, Kaohsiung (TW)

(73) Assignee: SiFive, Inc., Santa Clara, CA (US)

( * ) Notice: Subject to any disclaimer, the term of this patent is extended or adjusted under 35 U.S.C. 154(b) by 98 days.

(21) Appl. No.: 18/338,643

(22) Filed: Jun. 21, 2023

(65) Prior Publication Data
US 2024/0184588 A1 Jun. 6, 2024

Related U.S. Application Data

(60) Provisional application No. 63/429,930, filed on Dec. 2, 2022.

(51) Int. Cl.
*G06F 9/38* (2018.01)
*G06F 9/30* (2018.01)
(52) U.S. Cl.
CPC ........ *G06F 9/3867* (2013.01); *G06F 9/30043* (2013.01)

(58) Field of Classification Search
CPC ........................................ G06F 9/3867
See application file for complete search history.

(56) References Cited

U.S. PATENT DOCUMENTS

| 10,853,070 B1 * | 12/2020 | Shalev ................. G06F 9/383 |
| 2012/0089824 A1 * | 4/2012 | Fukagawa ............. G06F 9/38 712/E9.06 |
| 2019/0354508 A1 * | 11/2019 | Mahurin ............ G06F 9/30036 |
| 2022/0206793 A1 * | 6/2022 | Wong ................ G06F 9/3838 |

* cited by examiner

*Primary Examiner* — Michael J Metzger
(74) *Attorney, Agent, or Firm* — Kilpatrick Townsend & Stockton LLP

(57) ABSTRACT

A method for re-triggering wakeup to handle time skew between a scalar operation and a vector operation is provided. The method includes: initiating, before a Load-Store (LST) pipeline completes an execution of a load operation corresponding to a vector micro-operation (uop) dispatched to a baler issue queue, a respective load operation in a Load (LD) pipeline corresponding to the vector uop; triggering a speculative wakeup from the LD pipeline during an execution of the respective load operation; triggering a second wakeup corresponding to the speculative wakeup from the LD pipeline; and waking up, based on the second wakeup, the vector micro-operation in the baler issue queue of the baler unit.

20 Claims, 8 Drawing Sheets

RE-TRIGGERING WAKE-UP TO HANDLE TIME SKEW BETWEEN SCALAR AND VECTOR SIDES

CROSS REFERENCE TO RELATED APPLICATION

This application claims priority to and the benefit of U.S. Provisional Patent Application Ser. No. 63/429,930 filed on Dec. 2, 2022, the entire disclosure of which is hereby incorporated by reference.

TECHNICAL FIELD

This disclosure relates generally to integrated circuits and, more specifically, scalar and vector pipeline processing.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as decode units, rename units, dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A processor or processor core may execute instructions in a pipeline based on the microarchitecture that is implemented. The pipeline may be implemented by various components, such as decode units, rename units, dispatch units, execution units, registers, caches, queues, data paths, and/or other logic associated with instruction flow. In implementations, the processor may support out-of-order operation. In order to support out-of-order architecture and processing, scalar-side and/or scalar pipeline and vector-side and/or vector pipeline are decoupled as much as possible or should be less dependent on each other. This implies that the timing between the scalar-side and the vector-side can't be guaranteed.

Fast-path refers to a scenario where the load operation in the Load (LD) pipeline is initiated before the corresponding load operation in the Load-Store tag (e.g, Load and Store tag) (LST) pipeline finishes execution. This fast-path approach enhances parallelism between scalar and vector operations, which can improve overall performance. Slow-path, on the other hand, refers to a scenario where the load operation in the LD pipeline starts only after the corresponding load operation in the LST pipeline has completed execution. This approach ensures that there is no speculative behavior, as the LD pipeline action is triggered after resolving the LST pipeline operation.

Issues arise in the fast-path scenario, where the timing difference between scalar and vector operations can cause potential delays in the execution of vector micro-operations due to missed wakeup signals. For instance, consider a situation where the LD pipeline initiates a load operation before the LST pipeline has completed its corresponding load operation, and the LD pipeline sending a speculative wakeup signal to the vector micro-operation in the Baler issue queue before the vector micro-operation has even arrived at the queue.

Such issues can be addressed by introducing a re-triggering wakeup mechanism that ensures the vector micro-operation is woken up even if the initial speculative wakeup signal is missed due to the timing difference between scalar and vector operations. This mechanism helps maintain efficient execution of vector micro-operations without being delayed by the time skew between scalar and vector operations.

Described are methods and circuitry to mitigate the time skew by including re-triggering wake-up circuitry.

Figure 1:
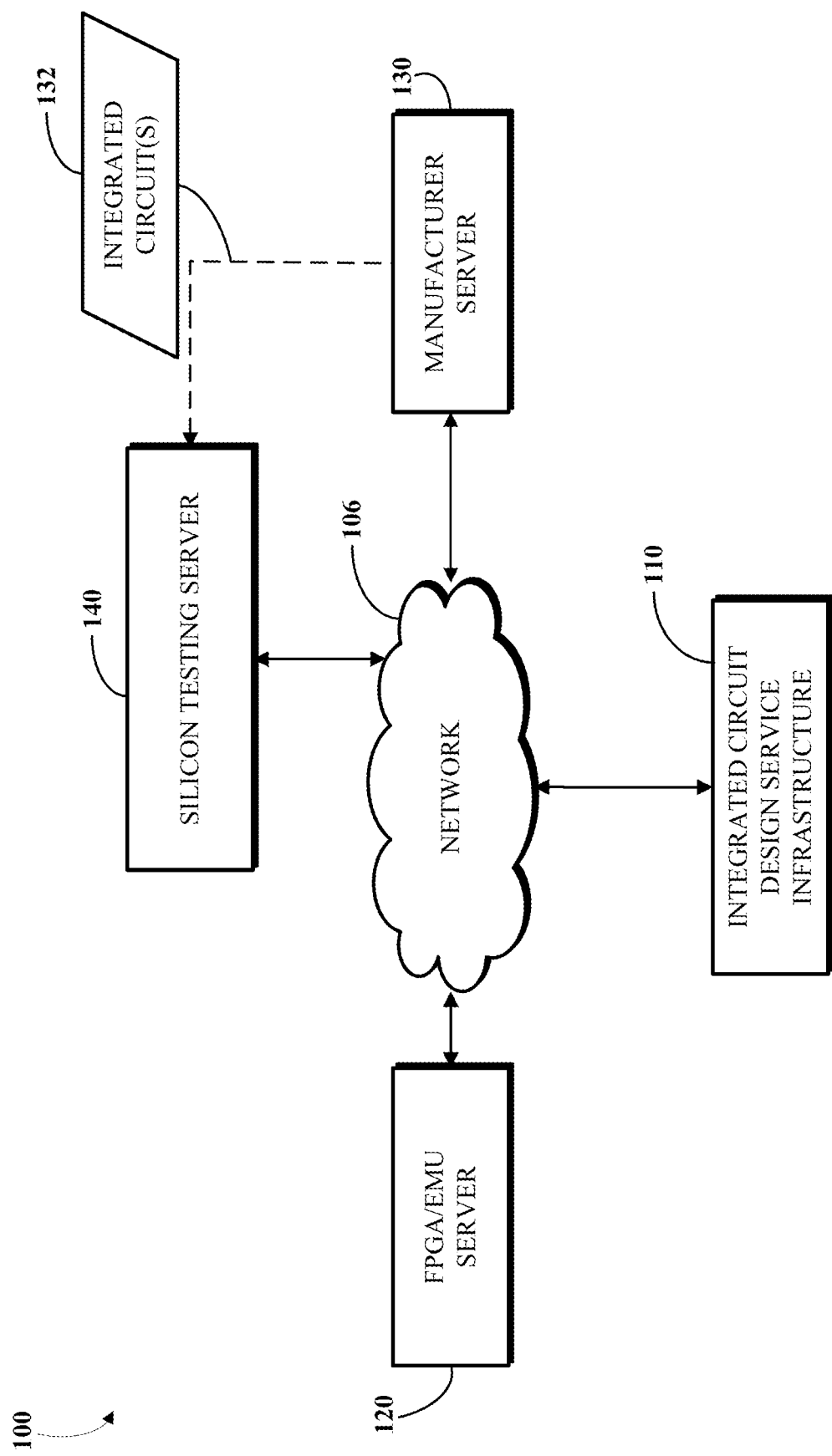
FIG. 1 is a block diagram of an example of a system for facilitating generation and manufacture of integrated circuits.

To describe some implementations in greater detail, reference is first made to examples of hardware and software structures used to implement a system including components that may incorporate the re-triggering wakeup mechanism. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-6.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
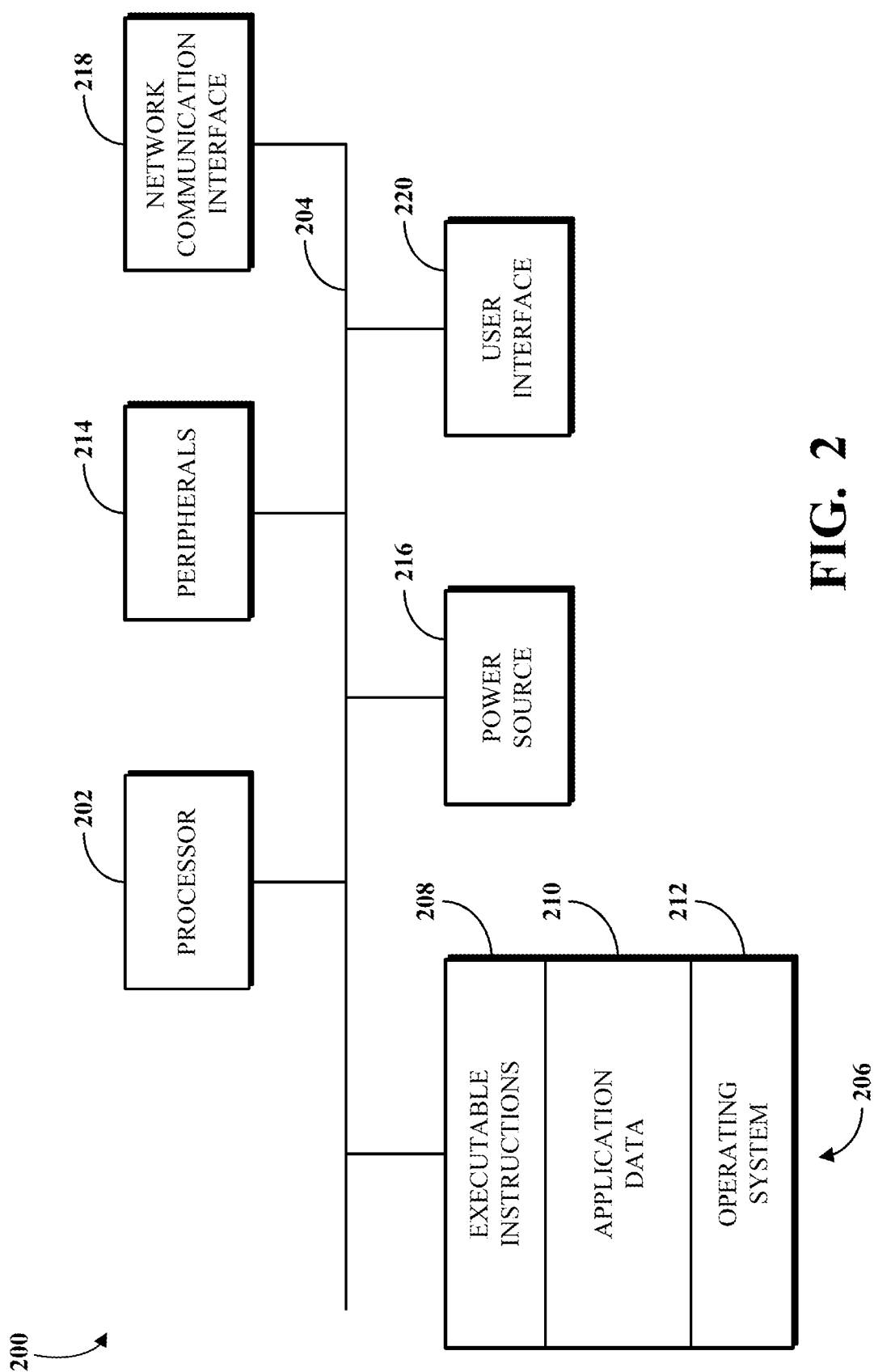
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-6.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
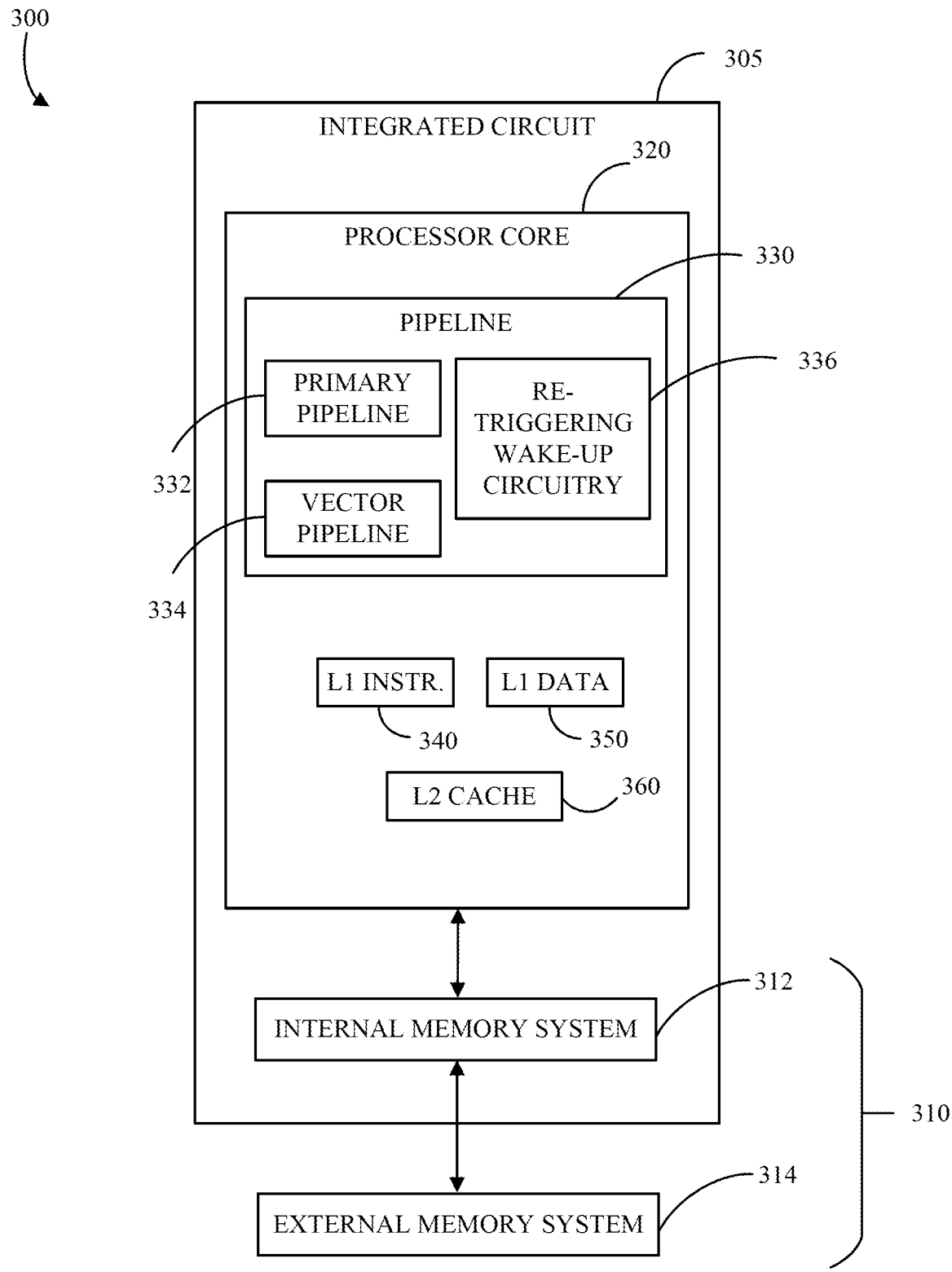
FIG. 3 is a block diagram of an example of an integrated circuit with a re-triggering wake-up circuitry, primary pipeline, and a vector pipeline.

FIG. 3 is a block diagram of an example of a system 300 including an integrated circuit 305 and a memory system 310. The integrated circuit 305 may include a processor core 320. The integrated circuit 305 could be implemented, for example, as a field-programmable gate array (FPGA), an application-specific integrated circuit (ASIC), or a system-on-chip (SoC). The memory system 310 may include an internal memory system 312 and an external memory system 314. The internal memory system 312 may be in communication with the external memory system 314. The internal memory system 312 may be internal to the integrated circuit 305 (e.g., implemented by the FPGA, the ASIC, or the SoC). The external memory system 314 may be external to integrated circuit 305 (e.g., not implemented by the FPGA, the ASIC, or the SoC). The internal memory system 312 may include, for example, a controller and memory, such as random access memory (RAM), static random access memory (SRAM), cache, and/or a cache controller, such as a level three (L3) cache and an L3 cache controller. The external memory system 314 may include, for example, a controller and memory, such as dynamic random access memory (DRAM) and a memory controller. In some implementations, the memory system 310 may include memory mapped inputs and outputs (MMIO), and may be connected to non-volatile memory, such as a disk drive, a solid-state drive, flash memory, and/or phase-change memory (PCM).

The processor core 320 may include circuitry for executing instructions, such as one or more pipelines 330, a level one (L1) instruction cache 340, an L1 data cache 350, and a level two (L2) cache 360 that may be a shared cache. The processor core 320 may fetch and execute instructions in the one or more pipelines 330, for example, as part of a program sequence. The instructions may cause memory requests (e.g., read requests and/or write requests) that the one or more pipelines 330 may transmit to the L1 instruction cache 340, the L1 data cache 350, and/or the L2 cache 360.

Each of the one or more pipelines 330 may include a primary pipeline 332, a vector pipeline 334, and a re-triggering wake-up circuitry 336. The primary pipeline 332 and the vector pipeline 334 each have separate decode units, rename units, dispatch units, execution units, physical and/or virtual registers, caches, queues, data paths, and/or other logic associated with instruction flow. In some implementations, the primary pipeline 332 and the vector pipeline 334 may be out-of-order pipelines. The re-triggering wake-up circuitry 336 may include various components and mechanisms that are described in FIGS. 4, 5, and 6 that help manage the timing differences between the primary pipeline 332 and the vector pipeline 334, ensuring proper synchronization between scalar and vector operations. Some of the components that can be part of the re-triggering wake-up circuitry 336 may include a Load-Store unit (LSU), a vector unit (VU), and a Baler unit (Baler). The system 300 and each component in the system 300 is illustrative and can include additional, fewer, or different components which may be similarly or differently architected without departing from the scope of the specification and claims herein. Moreover, the illustrated components can perform other functions without departing from the scope of the specification and claims herein.

Figure 4:
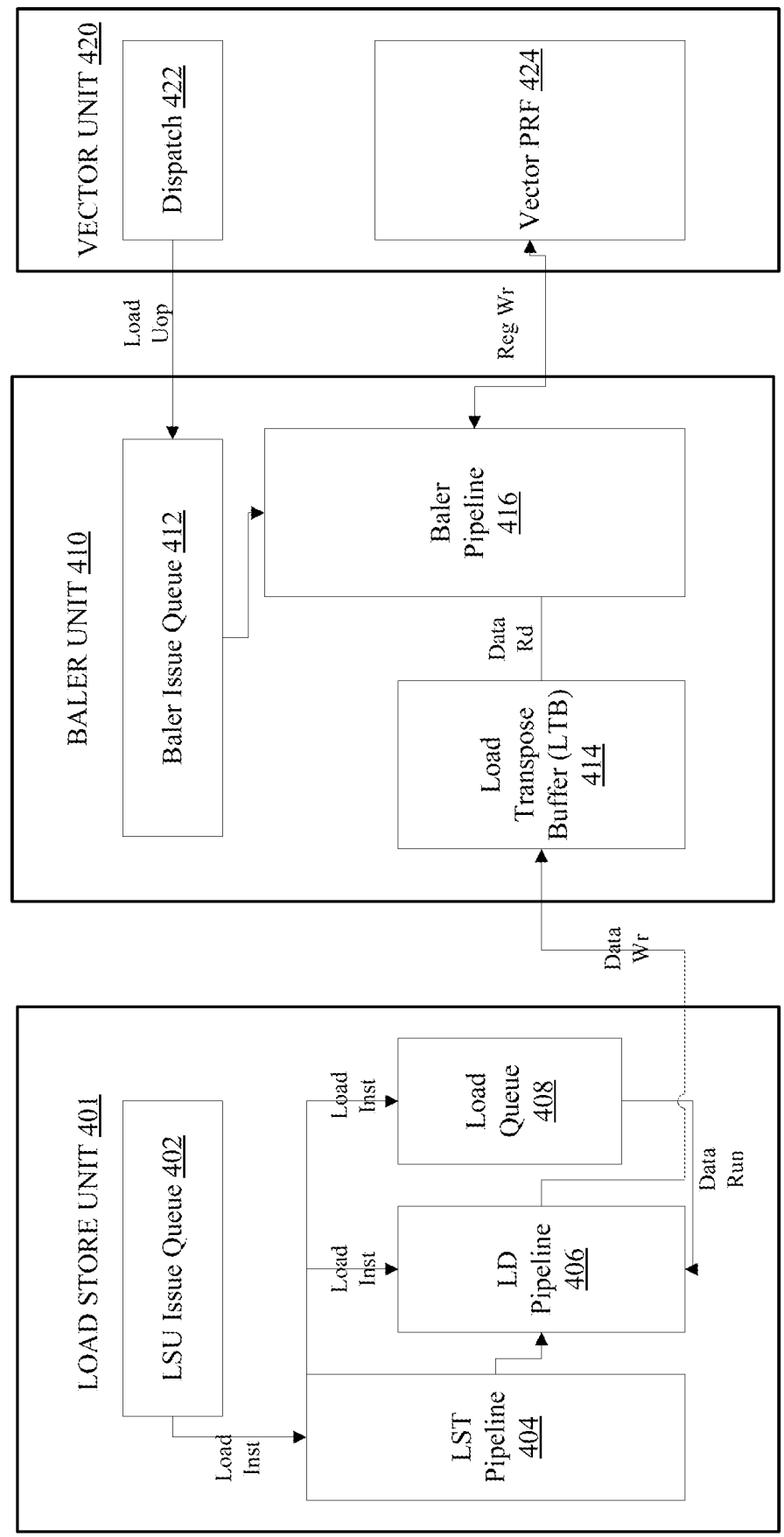
FIG. 4 is a block diagram illustrating a relationship between a load store unit (LSU), a Baler unit (Baler), and a Vector Unit or Processor (VU).

FIG. 4 is a block diagram 400 illustrating a relationship between a Load Store unit (LSU) 401, a Baler unit (Baler) 410, and a Vector Unit or Processor (VU) 420. The block diagram 400 and its components (e.g., LSU, Baler, VU) can be implemented, for example, by a processor, such as the processor core 320, a pipeline, such as the pipeline 330, the primary pipeline 332, and the vector pipeline 334, and/or the circuitry that incorporates a re-triggering wakeup mechanism (e.g., the re-triggering wake-up circuitry 336).

The LSU 401 may include an LSU issue queue 402, a LST pipeline 404, a LD pipeline 406, and a load queue 408. The Baler 410 may include a Baler issue queue 412, a Load Transpose Buffer (LTB) 414, and a Baler pipeline 416. The VU 420 may include a dispatch unit 422 and a Vector Physical Register Files (Vector PRF) 424.

The LSU 401 may load data from memory and prepare it for processing by the VU 420. By writing the data to the Load Transpose Buffer (LTB) 412, the LSU 401 may efficiently transfer data to the VU 420 for processing, without slowing down the LSU's ability to load more data from memory.

The LST pipeline 404 may be used to execute load instructions that involve data-dependent memory operations. These operations may require the LSU 401 to access the memory multiple times in order to retrieve the necessary data. The LST pipeline 404 may include stages for issuing the instruction, checking for hazards, performing memory access, and writing back the result.

The LD pipeline 406, on the other hand, is used to execute simple load instructions that do not require multiple memory accesses. Such instructions can be executed more quickly than those that involve data-dependent memory operations. The LD pipeline 406 may include stages for issuing the instruction, checking for hazards, performing memory access, and writing back the result.

The Baler 410 includes, but is not limited to, the Baler issue queue 410, the LTB 414, and the Baler pipeline 416. The Baler 410 may be an intermediate buffer between the LSU 401 and the VU 420. The Baler 410 may buffer the load data from the LSU 401 and the store data from VU 420. Further, the Baler 410 may manage the timing and coordination of micro-operations (uops) with other components, such as the LSU 401 and the LTB 414. The tracking of data readiness is done in the Baler 410 to wake-up the LSU 401 or VU 420 once the data is ready to be accessed.

The LTB 414 may be a type of an intermediate or load buffer used by the LSU 401 to temporarily store and handle data that has been loaded from memory before it is transferred for processing. Each LTB entry may store data read from memory including vector elements (e.g., individual data elements that are part of a vector), and metadata associated with vector elements (e.g., original memory addresses, vector register index, other information that helps transposition process). For each non-segmented load element, the LTB may load data into corresponding location within an LTB entry (like where it should in a vector register). For each segmented load element, the LTB may load the segments in an in-memory format (segments of an element are placed sequentially).

Baler issue queue 412, on the other hand, may be used to temporarily store uops that have been issued by the VU 420 for execution. Further, the Baler pipeline 416 may be a type of pipeline used in the execution or support of the execution of vector instructions or operations.

The VU 420 may include the dispatch unit 422 and the Vector Physical Register Files (Vector PRF) 424. The VU 420 may execute vector operations (e.g., vector uops) that have been issued by the processor. The dispatch unit 422 may communicate with and load vector uops to the Baler issue queue 412. The dispatch unit 422 may ensure coordination of the timing of uops to prevent conflict of resources and minimize stalls.

The Vector PRF 424 may store temporary results and operands for the vector uops during their execution. The Vector PRF 424 may hold the data elements being processed by the vector execution units and help manage register renaming and allocation for out-of-order execution. The Vector PRF 424 may be designed to support the parallelism and high-throughput requirements of vector operations. The Vector PRF 424 may communicate with the Baler pipeline 416 with regards to Register Read or Write. Moreover, the Register Read or Write depends on load or store operations. For example, reading from or writing to a Register may be contingent upon whether a load or store operation is taking place. For example, for the store operation, reading the data from the Register to write it back to memory may be necessary, and for the load operation, writing data from the memory into the register may be necessary.

Every load micro-operation may be individually handled in the scalar (LSU) side and vector (VU/Baler) side. In order to support out-of-order architecture and let scalar-side and vector-side decouple as much as possible, the scalar-side and vector-side should be less dependent on each other. Consequently, the timing of events are not guaranteed as between the scalar-side and the vector-side.

Fast-path refers to a scenario where the load operation in the Load (LD) pipeline is initiated before the corresponding load operation in the Load-Store tag (LST) pipeline finishes execution. This fast-path approach enhances parallelism between scalar and vector operations, thereby improving overall performance.

Slow-path, on the other hand, refers to a scenario where the load operation in the LD pipeline starts only after the corresponding load operation in the LST pipeline has completed execution. This approach ensures that there is no speculative behavior, as the LD pipeline action is triggered after resolving the LST pipeline operation.

Issues arise in the fast-path scenario, where the timing difference between scalar and vector operations can cause potential delays in the execution of vector micro-operations due to missed wakeup signals. For instance, consider a situation where the LD pipeline initiates a load operation before the LST pipeline has completed its corresponding load operation. In this case, the LD pipeline may send a speculative wakeup signal to the vector micro-operation in the Baler issue queue before the vector micro-operation has even arrived at the queue.

Such issues can be addressed by introducing a re-triggering wakeup mechanism that ensures the vector micro-operation is woken up even if the initial speculative wakeup signal is missed due to the timing difference between scalar and vector operations. This mechanism helps maintain efficient execution of vector micro-operations without being delayed by the time skew between scalar and vector operations.

Figure 5:
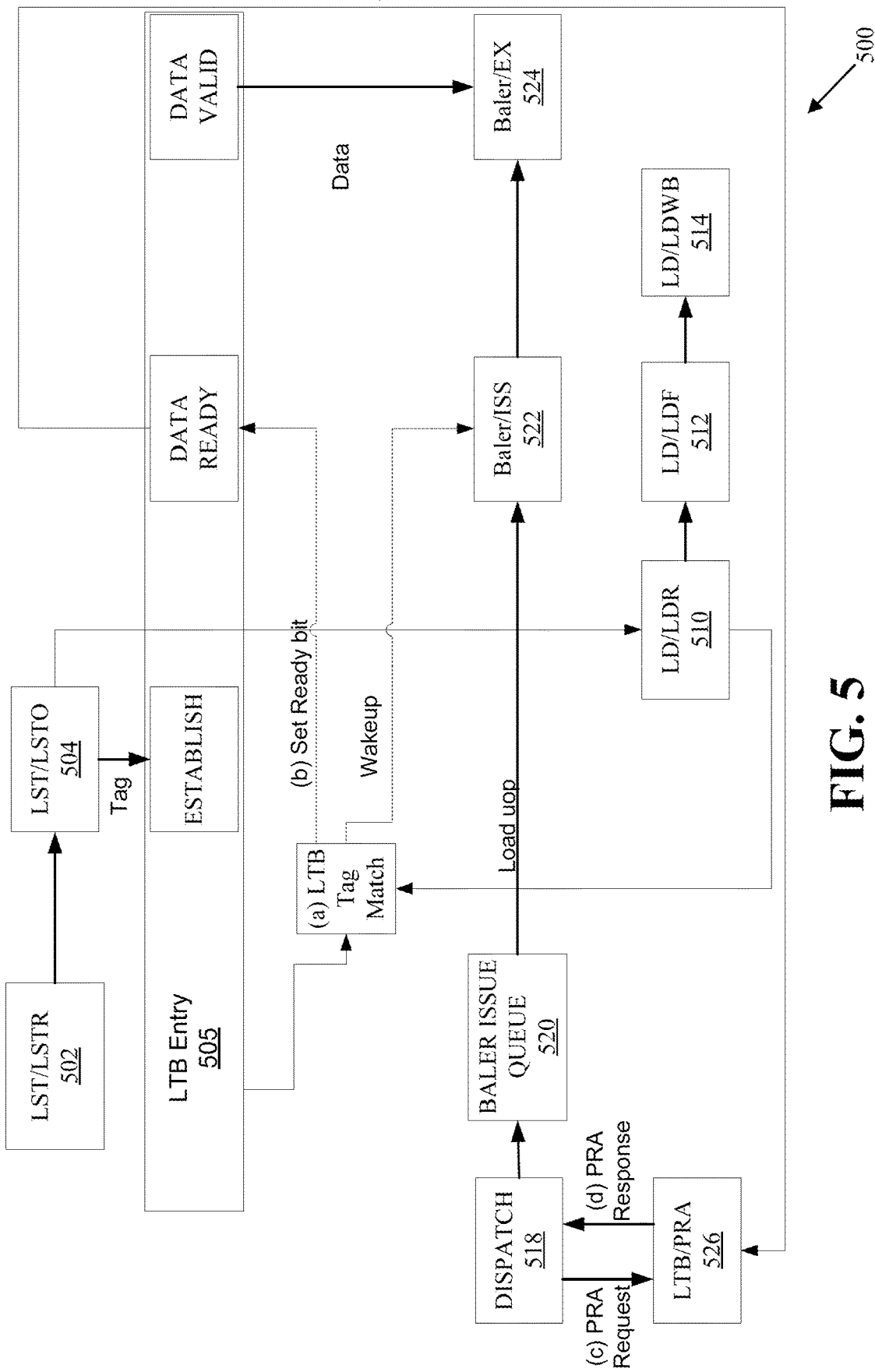
FIG. 5 is a block diagram illustrating a timing of a slow path pipeline flow.

FIG. 5 is a block diagram 500 illustrating a timing of a slow path pipeline flow. FIG. 5 illustrates that there is no speculative behavior because the action of LD pipeline (e.g., LD pipeline 406) is triggered after resolve (e.g., a respective load instruction is resolved, micro-operations can't be replayed (e.g., re-executed)). The block diagram 500 may incorporate the block diagram 400 and its components. Moreover, LST pipeline, LD pipeline, Baler pipeline, and LTB may correspond to the LST pipeline 404, the LD pipeline 406, the Baler pipeline 416, and the LTB 414, respectively.

After dispatch of vector operation (e.g., vector uop), the vector operation may reside in the Baler issue queue until the corresponding tag wakeup comes. Here, to ensure that data can be obtained from a LTB entry 505 of the LTB at an execution stage (EX-stage 524) for the Baler pipeline (such as the Baler Pipeline 416), the data valid bit for the corresponding tag should be set at this stage. A Load read stage of the LD pipeline (LD/LDR stage 510) is the earliest stage which can trigger the wake-up to make sure the data can be obtained at the EX-stage 524.

In operation, at (a) the LD/LDR stage 510, which comes earlier than a Load forwarding stage of LD pipeline (LD/LDF stage 512) and a Load data write back stage of LD pipeline (LD/LDWB stage 514), the request with a tag may be sent, and the tag may be used to compare with the tag of each entry in the LTB. If the tag matches, a wake-up is sent to the Baler issue queue 520. For example, the tag (e.g., tag identifier, tag number, serial number) may be created in front-end of pipeline stages [e.g., rename, decode stages, etc.] and such tag information exists in the LST pipeline (e.g., LST pipeline 404), LD pipeline (e.g., LD pipeline 406), and/or LTB (e.g., LTB 414). The tag may be used to compare with tag of each entry in the LTB.

At (b), in the meanwhile, the data ready bit of the corresponding entry may be set to indicate the resource of this entry is ready (not valid yet but to make sure data can arrive later (e.g., two cycles later) and matches the timing from an issue stage (ISS stage 522) of the Baler pipeline to EX stage 524 of the Baler pipeline.

At (c), a PRA request may be sent to a Physical Readiness Array (PRA) of the LTB (LTB/PRA 526), which is used for tracking the readiness of dependent source. As described above, the timing of arrival of the micro-operation (e.g., uop) can't be guaranteed. In this case, if the LD pipeline has finished its move but has not woken up a micro-operation in the Baler issue queue 520, it's because the micro-operation in the vector-side has not arrived at the Baler issue queue 520 yet. But afterward, when the micro-operation does arrive at the dispatch stage 518, the micro-operation will check the readiness of resources. In this case, the data ready bit is set in the LTB buffer (which was set by the LD pipeline operation).

Figure 6:
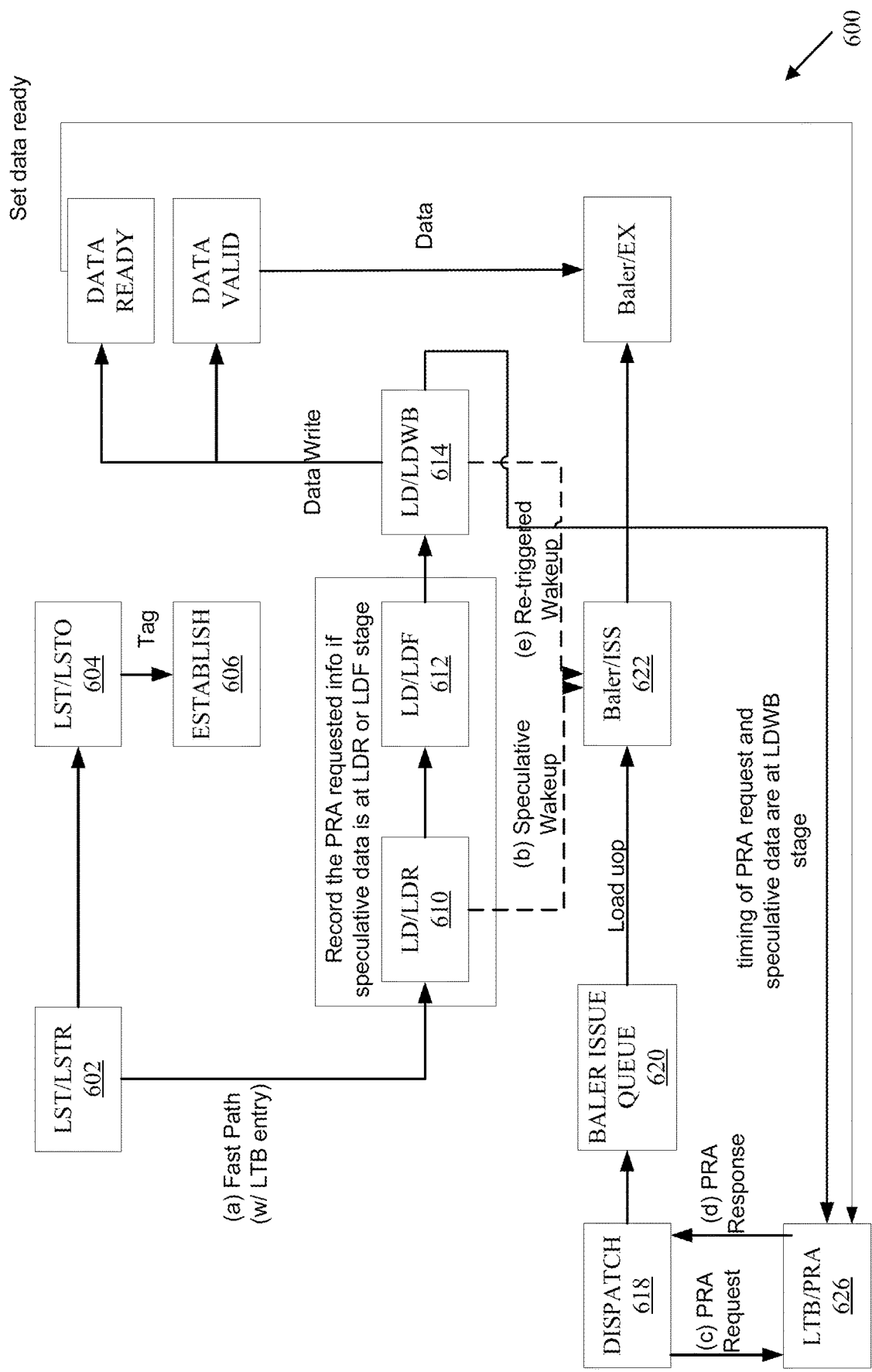
FIG. 6 is a block diagram illustrating a timing of a fast-path pipeline flow with re-triggering wakeup.

At (d), a response of a LTB/PRA 526 to the PRA request would be true in this case. The micro-operation has no need to wait for wake-up because it (e.g., data, data bit) has been set as ready and the micro-operation can be issued from the Baler issue queue 520 and/or the issue stage (ISS stage 522) of the Baler pipeline. FIG. 6 is a block diagram 600 illustrating a timing of a fast-path pipeline flow with re-triggering wakeup. FIG. 6 illustrates a speculative behavior because the action of LD pipeline is triggered before resolve. The block diagram 600 may incorporate the block diagram 400 and its components. Moreover, LST pipeline, LD pipeline, Baler pipeline, and LTB may, for example, correspond to the LST pipeline 404, the LD pipeline 406, the Baler pipeline 416, and the LTB 414, respectively.

In operation, at (a), in order to support fast-path, another wake-up mechanism beside "LTB tag matching" to Baler issue queue 620 may be added. Since the LD/LDR stage 610 is earlier than a Load/Store ordering stage of the LST pipeline (LST/LSTO stage 604) in fast-path, the tag at LDR stage 610 will come to LTB earlier than the LTB entry establishment (at establish stage 606). Therefore, at the Load/Store register read stage of LST pipeline (LST/LSTR stage 602), before going to the LD arbitration stage, a claimed freelist (e.g., list that is used to obtain information of which free entries in the LTB can be used for later stages) can be used to obtain an entry number. In this way, the LDR stage 610 can index the corresponding LTB entry without gid/csid tag matching. Further, LTB entry may carry data from the LST pipeline to the LD pipeline.

At (b), the speculative wakeup signal may be transmitted to the Baler issue queue 620. In some implementations, the speculative wakeup signal may be transmitted to the Baler Pipeline (e.g., issue stage (ISS stage 622) of the Baler Pipeline), as the ISS stage 622 of the Baler pipeline or the Baler pipeline may be in communication with the Baler issue queue 620. Even though the FIG. 6 illustrates that the speculative wakeup signal may be transmitted to the ISS stage 622, it may be transmitted to Baler issue queue 620, and this applies to (e) as well. After support of fast-path and speculative wake-up, there may be a change to support replay from the LD pipeline. If there is a replay happening from a LD/LDF stage 612, the LD pipeline signals replay to all dependencies like the LTB pipeline. The LTB pipeline may take this source replay into consideration for its own pipeline replay, throwing the current micro-operation back into the Baler issue queue 620 and waiting for the next wake-up. Therefore, a speculative load can only be set as ready (e.g., data ready, data bit ready) for PRA read when its source can't replay anymore (e.g., at LD/LDWB stage 614).

At (c), a PRA request may be sent (e.g., transmitted) to a PRA of the LTB (LTB/PRA 526), which is used for tracking the readiness of dependent source. If the arrival of the micro-operation (e.g., from the vector side, the vector unit, or the vector processor) at the dispatch stage 618 is at when the micro-operation in the LD pipeline also arrives at the LDR, LDF, LDWB, or after LDWB stage (e.g., LD/LDR stage 610, LD/LDF stage 612, LD/LDWB stage 614, or after LDWB stage 614), then there may be three different cases. If the micro-operation in the LD pipeline arrives: (c)(1) after LDWB stage 614, the data ready bit has been set in the PRA of the LTB (LTB/PRA 626) and readiness can be determined; and (c)(2) at LDWB stage 614, readiness can be determined by the LDWB stage information; however, problem arises if it arrives (c)(3) at LDR stage 610 and LDF stage 612, where these two cycles are in a time skew such that they can't be set as ready, and a wake-up at LDR stage 610 does not wake-up any micro-operation inside the Baler issue queue because the micro-operation has not arrived yet.

At (d), for the (c)(3) case at LDR stage 610 and LDF stage 612, it may be not possible to obtain the positive readiness, and thus, there must be a wake-up from the LTB in the near future. As such, at first, it may be necessary to save the status of incoming PRA request at (c), but not respond to the case.

For example, saving (e.g., storing) the status of the incoming PRA request may indicate that the readiness of data is still being tracked (e.g., data is expected but not yet available). This information may be used to trigger another speculative wakeup again when the corresponding data becomes available, which may ensure that the load operation is not stalled and can continue its execution. For example, the PRA may be not set as ready timely since this scenario corresponds to a speculative load and there is time skew between scalar operation (or scalar side pipelines) and vector operation (or vector side pipelines), and the PRA may save the status, e.g., that the PRA is not ready or data or data bit is not ready, but that a request (whether speculative or not, or subsequent request) is coming. At (e), it may be necessary to re-trigger the speculative wakeup at the LD/LDWB stage 614. PRA request may be sent again. PRA may respond accordingly depending on the status of whether the data or data bit is ready or not. Moreover, if PRA, data, or data bit is set as ready, then wakeup may not be needed, and vice versa.

As such, issues of such time skew or the timing difference between scalar and vector operations due to missed wakeup signals can be addressed by introducing a re-triggering wakeup mechanism that ensures the vector micro-operation is woken up even if the initial speculative wakeup signal is missed due to the timing difference between scalar and vector operations.

Figure 7:
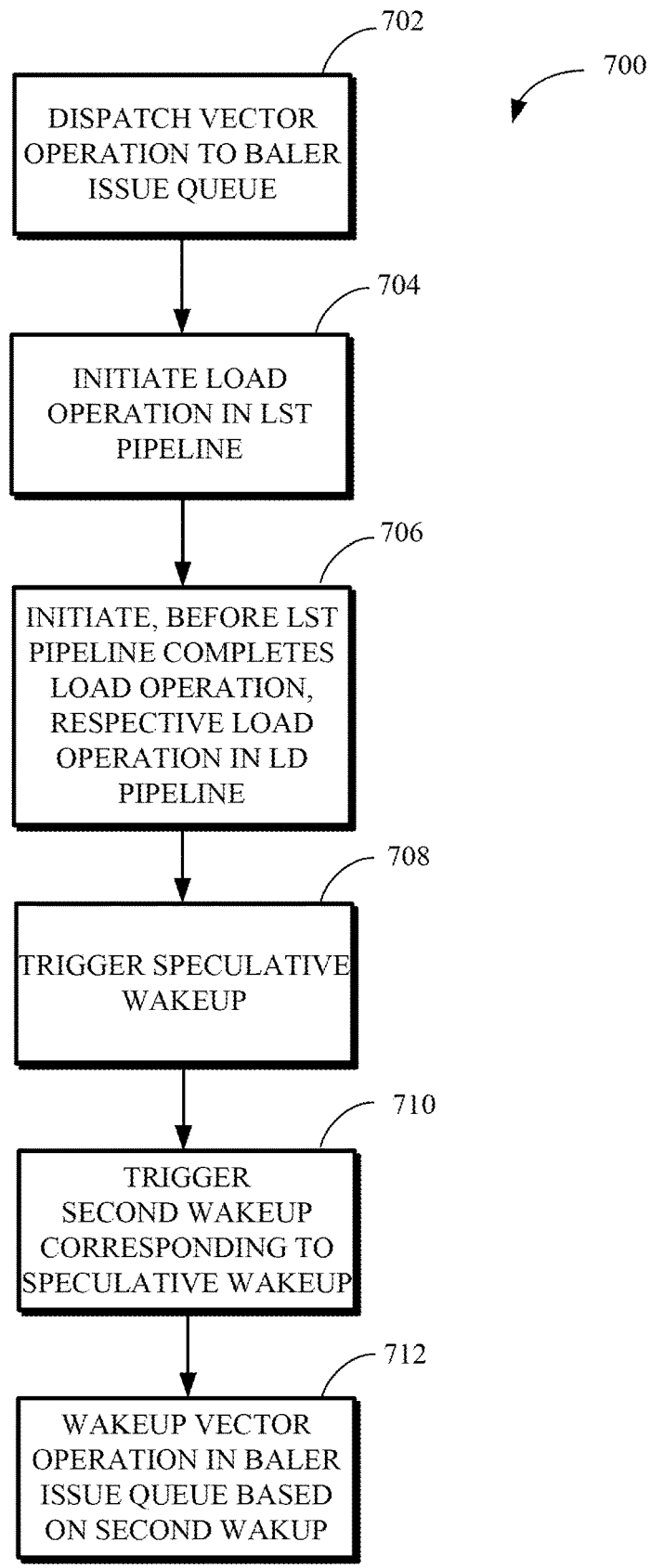
FIG. 7 is a flowchart diagram of a method of re-triggering wakeup to handle time skew between a scalar operation and a vector operation.

FIG. 7 is a flowchart diagram of a method 700 of re-triggering wakeup to handle time skew between a scalar operation and a vector operation. For example, the vector operation may be a vector micro-operation (uop) described above. The method 700 can be implemented, for example, by a processor, such as the processor 202, the processor core 320, a pipeline such as the pipeline 330, and/or any circuitry that may incorporate the fast-path scenario as described above. Further, components, time cycles, different stages of operation, and other information from FIG. 6 may be incorporated into the method 700.

At 702, the method 700 dispatches a vector micro-operation (uop) from the VU to the Baler issue queue of the Baler. For example, a vector instruction may be fetched and decoded into vector uop, and the vector uop may be dispatched to the Baler issue queue. At Baler issue queue, the vector uop may wait for its source operands (e.g., from the scalar side) to become ready. The Baler issue queue may monitor readiness of the operands using mechanisms such as tag matching or re-triggered wake up signals.

At 704, the method 700 initiates a respective load operation in a LST pipeline. The respective load operation (e.g., load uop) (hereinafter "LST load uop") may be a part of the scalar operation (e.g., scalar uop) (e.g., which may retrieve the data needed for the vector uop to execute) that corresponds to or is counterpart of the vector uop. For example, a load instruction may be fetched and decoded into the LST load uop, and the LST load uop may be dispatched to the LST pipeline for processing. In some implementations, the LST pipeline may issue the load uop to the LSU, which may manage memory access and ensure that the load operation accesses the correct memory address.

At 706, the method 700 initiates, before LST pipeline completes the respective load operation, a respective load operation (e.g., load uop) (hereinafter "LD load uop") in LD pipeline. The LD load uop may be part of the scalar operation or the scalar uop (e.g., which may retrieve the data needed for the vector uop to execute) that corresponds to or is counterpart of the vector uop.

At 708, the method 700 may trigger a speculative wakeup. For example, triggering of the speculative wakeup from the LD pipeline may occur during an execution of the LD load uop. For example, the vector uop may need the scalar uop or data from memory that is being fetched by the LST load uop in the LST pipeline when the LST load uop in the LST pipeline is not finished yet. The LD pipeline includes at least a LDR stage, a LDF stage, and a LDWB stage, and triggering the speculative wakeup from the LD pipeline occurs during the LDR stage or the LDF stage.

In some implementations, another wake-up mechanism, beside LTB tag matching to Baler issue queue, can be added to support a fast-path. That is, in fast-path, since the LDR stage (of the LD pipeline) is earlier than the LSTO stage (one pipeline stage in LST pipeline where entry is established) and thus tag at the LDR stage may come to LTB (of the Baler) earlier than LTB entry establishment, another wakeup mechanism can be added to or supplanted with the tag-matching. For example, at the LSTR stage (of the LST pipeline), before going to the LD arbitration stage (of the LD pipeline), claimed freelist can be used to get an entry number. In this way, at the LDR stage, the method 700 or an operation (e.g., uop) at LDR can index the corresponding LTB entry without gid/csid tag matching. In some implementations, after support of fast-path and speculative wakeup, there may be a chance to support replay from the LD pipeline. If there is a replay happening from the LDF stage, the LD pipeline may signal replay to one or more dependencies like the LTB (or LTB pipeline). The LTB may take this source replay into consideration for its own pipeline replay, throwing the current uop back into the Baler issue queue and waiting for the next wake-up. As such, the speculative load can only be set as ready for PRA read when its source can't replay anymore (e.g., at LDWB stage).

In some implementations, the method 700 may transmit a first request (e.g., from the baler unit) to a physical readiness array (PRA) of a load transpose buffer (LTB) (e.g., of the baler unit) to track a readiness of the data derived from the execution of the corresponding load operation. The PRA may be responsible for tracking the readiness of dependent source or monitoring the availability of data and informing the dependent vector uop when the data is ready to be used. The PRA may not respond to the first request (since the data may not be ready or available yet), and store a status of the first request in an internal register of the processor. Storing the status of the first request may indicate that the readiness of data is still being tracked (e.g., data is expected but not yet available). This information may be used to trigger another speculative wakeup again when the corresponding data becomes available, which may ensure that the load operation is not stalled and can continue its execution. For example, the PRA may be not set as ready timely since this scenario corresponds to a speculative load and there is time skew between scalar operation (or scalar pipes) and vector operation (or vector pipes), and the PRA may store (e.g., save) the status, e.g., that the PRA is not ready, but that a request (whether speculative or not, or subsequent request) is coming, in an internal register of the processor.

Depending on that the arrival timing of the vector uop at the dispatch stage happens when the scalar uop or the part of the scalar uop (e.g., LD load uop) in the LD pipeline arrives or is at the LDR stage, the LDF stage, LDWB stage, and after LDWB stage, there may be three scenarios: (1) After LDWB stage, the data ready bit has been set and readiness can be determined by this; (2) at LDWB stage, readiness can be determined by the LDWB stage information; and the problem (3) at LDR/LDF stage, the two cycles are in a time skew, so can't set as ready and wake-up at LDR stage doesn't wake-up any uop inside the Baler issue queue because the uop hasn't arrived yet. As such, for the third scenario, there should be another wake-up from the LTB in the near future, which is described by next step.

At 710, the method 700 may trigger a second wakeup corresponding to speculative wakeup. For example, in response to an availability of the data or anticipation of the data arrival in the near future, the method 700 may trigger the second wakeup corresponding to the speculative wakeup. For example, the second wakeup may be triggered after storing the status of the first request. In some implementations, the second wakeup may be the speculative wakeup such that the method 700 triggers the speculative wakeup for the second time. In some implementations, the second wakeup may be triggered during or after the LDWB stage. In some implementations, in response to confirming that the subsequent speculative request (which may or may not be equivalent to the prior speculative request) is confirmed as non-speculative request, the method 700 may re-trigger the wakeup (e.g., second wakeup) during or after the LDWB stage.

At 712, the method 700 may wake up vector uop in baler issue queue based on the second wakeup.

After the method 700 wakes up the vector operation in the baler issue queue based on the second wakeup, the method 700 may select and send respective vector uop to the appropriate execution unit in the vector pipeline for processing. For example, the data (e.g., scalar data, data derived from scalar operation or LD uop and/or LST uop) may be sent to the Baler pipeline, and the vector uop may be sent to the Baler pipeline which may be used in the execution or support of the execution (e.g., when the vector uop and/or scalar data are forwarded to an appropriate execution unit or the VU executes the vector uop and/or instructions). The Vector PRF may communicate and/or cooperate with the Baler pipeline with regards to Register Write. The LTB may be in communication Baler Pipeline such that the data (e.g., scalar data, data derived from scalar operation or LD uop and/or LST uop) may be communicated (e.g., data read) between the LTB and the Baler Pipeline.

The execution of vector operation may involve the necessary computations on the input data (e.g., scalar data, data derived from scalar operation or LD uop and/or LST uop), which may involve vector arithmetic or other vector operations. Once the execution is complete, the results may be written back to the appropriate destination registers or memory locations.

Figure 8:
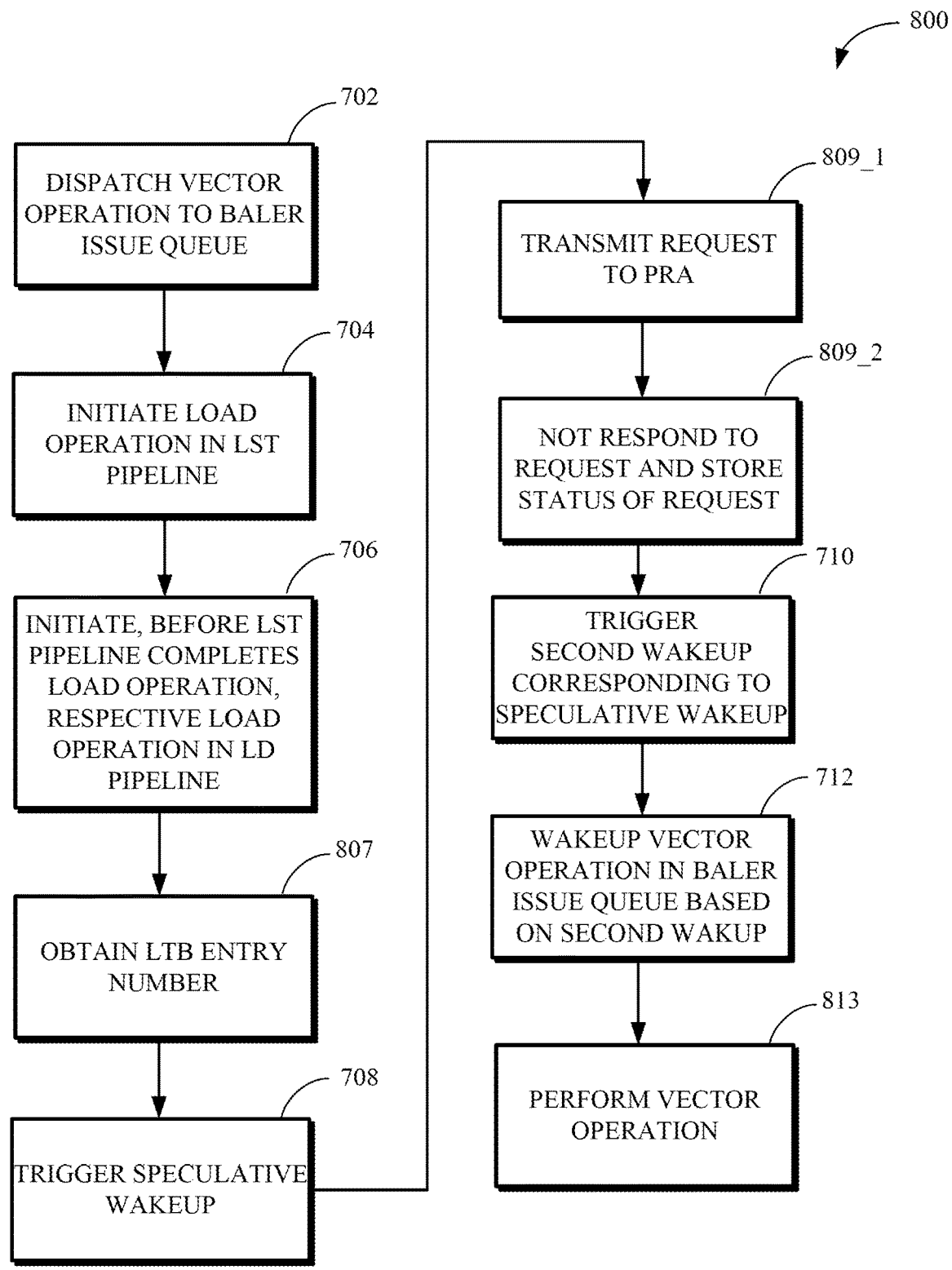
FIG. 8 is a flowchart diagram of an example implementation of re-triggering wakeup to handle time skew between a scalar operation and a vector operation.

FIG. 8 is a flowchart diagram of an example implementation 800 of re-triggering wakeup to handle time skew between a scalar operation and a vector operation. For example, the vector operation may be a vector micro-operation (uop) described above. The method 800 can be implemented, for example, by a processor, such as the processor 202, the processor core 320, a pipeline such as the pipeline 330, and/or any circuitry that may incorporate the fast-path scenario as described above. Further, components, time cycles, different stages of operation, and other information from FIG. 6 may be incorporated into the method 800.

At 702, the method 800 dispatches a vector micro-operation (uop) from the VU to the Baler issue queue of the Baler. The technique used at 702 with respect to the method 800 can be the same as the step 702 described with regards to the method 700, so the technique is not repeatedly mentioned here. At 704, the method 800 initiates a respective load operation in a LST pipeline.

At 706, the method 800 initiates, before LST pipeline completes the respective load operation, a respective load operation (e.g., load uop) (hereinafter "LD load uop") in LD pipeline. The LD load uop may be part of the scalar operation or the scalar uop (e.g., which may retrieve the data needed for the vector uop to execute) that corresponds to or is counterpart of the vector uop.

At 807, the method 800 may obtain an LTB entry number. In some implementations, claimed freelist can be used to generate or obtain the LTB entry number. Obtaining the LTB entry number can be a part of or an another wake-up mechanism in addition to or in supplant of a tag-matching mechanism. For example, beside LTB tag matching to Baler issue queue, can be added to support a fast-path. That is, in fast-path, since the LDR stage (of the LD pipeline) is earlier than the LSTO stage (of the LST pipeline) and thus tag at the LDR stage may come to LTB (of the Baler) earlier than LTB entry establishment, another wake-up mechanism can be added to or supplanted with the tag-matching. For example, at the LSTR stage (of the LST pipeline), before going to the LD arbitration stage (of the LD pipeline), the claimed freelist can be used to get (e.g., obtain) an entry number. In this way, at the LDR stage, the method 800 or an operation (e.g., uop) at LDR can index the corresponding LTB entry without gid/csid tag matching. In some implementations, after support of fast-path and speculative wake-up, there may be a chance to support replay from the LD pipeline. If there is a replay happening from the LDF stage, the LD pipeline may signal replay to one or more dependencies like the LTB (or LTB pipeline). The LTB may take this source replay into consideration for its own pipeline replay, throwing the current uop back into the Baler issue queue and waiting for the next wake-up. As such, the speculative load can only be set as ready for PRA read when its source can't replay anymore (e.g., at LDWB stage).

At 708, the method 800 may trigger a speculative wakeup. For example, triggering of the speculative wakeup from the LD pipeline may occur during an execution of the LD load uop. For example, the vector uop may need the scalar uop or data from memory that is being fetched by the LST load uop in the LST pipeline when the LST load uop in the LST pipeline is not finished yet. The LD pipeline includes at least a LDR stage, a LDF stage, and a LDWB stage, and triggering the speculative wakeup from the LD pipeline occurs during the LDR stage or the LDF stage.

At 809_1, the method 800 may transmit a first request (e.g., from the baler unit) to a physical readiness array (PRA) of a load transpose buffer (LTB) (e.g., of the baler unit) to track a readiness of the data derived from the execution of the corresponding load operation. The PRA may be responsible for tracking the readiness of dependent source or monitoring the availability of data and informing the dependent vector uop when the data is ready to be used.

At 809_2, the method 800 may not respond to the first request and store status of the first request. For example, the PRA may not respond to the first request (since the data may not be ready or available yet), and may store a status of the first request in an internal register of the processor. Storing the status of the first request may indicate that the readiness of data is still being tracked (e.g., data is expected but not yet available). This information may be used to trigger another speculative wakeup again when the corresponding data becomes available, which may ensure that the load operation is not stalled and can continue its execution.

Depending on that the arrival timing of the vector uop at the dispatch stage happens when the scalar uop or the part of the scalar uop (e.g., LD load uop) in the LD pipeline arrives or is at the LDR stage, the LDF stage, LDWG stage, and after LDWB stage, there may be three scenarios: (1) After LDWB stage, the data ready bit has been set and readiness can be determined by this; (2) at LDWB stage, readiness can be determined by the LDWB stage information; and the problem (3) at LDR/LDF stage, the two cycles are in a time skew, so can't set as ready and wake-up at LDR stage doesn't wake-up any uop inside the Baler issue queue because the uop hasn't arrived yet. As such, for the third scenario, there should be another wake-up from the LTB in the near future, which is described by next step.

At 710, the method 800 may trigger a second wakeup corresponding to speculative wakeup. The technique used at 710 with respect to the method 800 can be the same as step 710 described with regards to the method 700, so the technique is not repeatedly mentioned here.

At 712, the method 800 may wake up vector uop in baler issue queue based on the second wakeup. The technique used at 710 with respect to the method 800 can be the same as the step 710 described with regards to the method 700, so the technique is not repeatedly mentioned here.

At 813, the method 800 may perform vector operation (e.g., vector uop). After the method 700 wakes up the vector operation in the baler issue queue based on the second wakeup, the method 700 may select and send respective vector uop to the appropriate execution unit in the vector pipeline for processing. For example, the data (e.g., scalar data, data derived from scalar operation or LD uop and/or LST uop) may be sent to the Baler pipeline, and the vector uop may be sent to the Baler pipeline which may be used in the execution or support of the execution (e.g., when the vector uop and/or scalar data are forwarded to an appropriate execution unit or the VU executes the vector uop and/or instructions). The Vector PRF may communicate and/or cooperate with the Baler pipeline with regards to Register Write. The LTB may be in communication Baler Pipeline such that the data (e.g., scalar data, data derived from scalar operation or LD uop and/or LST uop) may be communicated (e.g., data read) between the LTB and the Baler Pipeline. The execution of vector operation may involve the necessary computations on the input data (e.g., scalar data, data derived from scalar operation or LD uop and/or LST uop), which may involve vector arithmetic or other vector operations.

Once the execution is complete, the results may be written back to the appropriate destination registers or memory locations.

The described methods and systems include a method for re-triggering wakeup to handle time skew between a scalar operation and a vector operation. The method includes initiating, before a Load-Store (LST) pipeline completes an execution of a load operation corresponding to a vector micro-operation (uop) dispatched to a baler issue queue, a respective load operation in a Load (LD) pipeline corresponding to the vector uop; triggering a speculative wakeup from the LD pipeline during an execution of the respective load operation; triggering a second wakeup corresponding to the speculative wakeup from the LD pipeline; and waking up, based on the second wakeup, the vector uop in the baler issue queue of the baler unit. In implementations, the LD pipeline includes at least a load read (LDR) stage, a load forwarding (LDF) stage, and a load data write back (LDWB) stage, and triggering the speculative wakeup from the LD pipeline occurs during the LDR stage. In implementations, the method can further include transmitting from the baler unit, a first request to a physical readiness array (PRA) of a load transpose buffer of the baler unit to track a readiness of data derived from the execution of the corresponding load operation; not responding, by the PRA, to the first request; and storing a status of the first request. In implementations, the second wakeup corresponding to the speculative wakeup from the LD pipeline is triggered after storing the status of the first request.

In implementations, the LD pipeline includes at least a LDR stage, a LDF stage, and a LDWB stage, and triggering the speculative wakeup from the LD pipeline occurs during the LDF stage. In implementations, the method can further include transmitting from the baler unit, a first request to a physical readiness array (PRA) of a load transpose buffer of the baler unit to track a readiness of data derived from the execution of the corresponding load operation; not responding, by the PRA, to the first request; and storing a status of the first request. In implementations, the second wakeup corresponding to the speculative wakeup from the LD pipeline is triggered after storing the status of the first request.

The described methods and systems include a non-transitory computer readable medium that includes a circuit representation. The circuit representation, when processed by a computer, can be used to program or manufacture an integrated circuit that includes a processor. Such processor can include a circuitry configured to initiate, before a Load-Store (LST) pipeline completes an execution of a load operation corresponding to a vector micro-operation (uop) dispatched to a baler issue queue, a respective load operation in a Load (LD) pipeline corresponding to the vector uop; trigger a speculative wakeup from the LD pipeline during an execution of the respective load operation; trigger a second wakeup corresponding to the speculative wakeup from the LD pipeline; and wake up, based on the second wakeup, the vector uop in the baler issue queue of the baler unit.

In implementations, triggering the speculative wakeup from the LD pipeline occurs during the LDR stage. In implementations, the processor can be further configured to: transmit, from the baler unit, a first request to a physical readiness array (PRA) of a load transpose buffer of the baler unit to track a readiness of data derived from the execution of the respective load operation; not respond, by the PRA, to the first request; and store a status of the first request in an internal register of the processor. In implementations, the second wakeup corresponding to the speculative wakeup from the LD pipeline is triggered after storing the status of the first request.

In implementations, the LD pipeline includes at least a LDR stage, a LDF stage, and a LDWB stage; and triggering the speculative wakeup from the LD pipeline occurs during the LDF stage. In implementations, the processor can be further configured to: transmit, from the baler unit, a first request to a physical readiness array (PRA) of a load transpose buffer of the baler unit to track a readiness of data derived from the execution of the respective load operation; not respond, by the PRA, to the first request; and store a status of the first request in an internal register of the processor. In implementations, the second wakeup corresponding to the speculative wakeup from the LD pipeline is triggered after storing the status of the first request. In implementations, the processor can be further configured to generate an entry number from a claimed freelist such that a respective uop at LDR can index a corresponding Load Transpose Buffer (LTB) entry.

The described methods and systems include an integrated circuit. The integrated circuit can include a baler unit having a baler issue queue, a vector processing unit, a Load-Store unit (LSU) having a Load-Store (LST) pipeline and a Load (LD) pipeline, and a processor. The processor is configured to: initiate, before a Load-Store (LST) pipeline completes an execution of a load operation corresponding to a vector micro-operation (uop) dispatched to a baler issue queue, a respective load operation in a Load (LD) pipeline corresponding to the vector uop; trigger a speculative wakeup from the LD pipeline during an execution of the respective load operation; trigger a second wakeup corresponding to the speculative wakeup from the LD pipeline; and wake up, based on the second wakeup, the vector micro-operation in the baler issue queue of the baler unit.

In implementations, the LD pipeline includes at least a load read (LDR) stage, a load forwarding (LDF) stage, and a load data write back (LDWB) stage; and triggering the speculative wakeup from the LD pipeline occurs during the LDR stage or the LDF stage. In implementations, the LD pipeline includes at least a load read (LDR) stage, a load forwarding (LDF) stage, and a load data write back (LDWB) stage, and triggering the speculative wakeup from the LD pipeline occurs during the LDR stage or the LDF stage. In implementations, the baler unit can further include a load transpose buffer that includes a physical readiness array (PRA), and the processor can be further configured to: transmit, from the baler unit, a first request to the PRA of the load transpose buffer of the baler unit to track a readiness of data derived from the execution of the respective load operation; not respond, by the PRA, to the first request; and store a status of the first request in an internal register of the processor. In implementations, the second wakeup corresponding to the speculative wakeup from the LD pipeline is triggered after storing the status of the first request. In implementations, the processor can be further configured to generate an entry number from a claimed freelist such that a respective uop at LDR can index a corresponding Load Transpose Buffer (LTB) entry.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A method for re-triggering wakeup to handle time skew between a scalar operation and a vector operation, comprising:
    initiating, before a Load-Store (LST) pipeline completes an execution of a load operation corresponding to a vector micro-operation (uop) dispatched to a baler issue queue, a respective load operation in a Load (LD) pipeline corresponding to the vector uop;
    triggering a speculative wakeup from the LD pipeline during an execution of the respective load operation;
    triggering a second wakeup corresponding to the speculative wakeup from the LD pipeline; and
    waking up, based on the second wakeup, the vector uop in the baler issue queue of the baler unit.

2. The method of claim 1, wherein:
    the LD pipeline includes at least a load read (LDR) stage, a load forwarding (LDF) stage, and a load data write back (LDWB) stage; and
    triggering the speculative wakeup from the LD pipeline occurs during the LDR stage.

3. The method of claim 1, wherein:
    the LD pipeline includes at least a LDR stage, a LDF stage, and a LDWB stage; and
    triggering the speculative wakeup from the LD pipeline occurs during the LDF stage.

4. The method of claim 2, further comprising:
    transmitting, from the baler unit, a first request to a physical readiness array (PRA) of a load transpose buffer of the baler unit to track a readiness of data derived from the execution of the corresponding load operation;
    not responding, by the PRA, to the first request; and
    storing a status of the first request.

5. The method of claim 3, further comprising:
    transmitting, from the baler unit, a first request to a physical readiness array (PRA) of a load transpose buffer of the baler unit to track a readiness of a data derived from the execution of the respective load operation; and not responding, by the PRA, to the first request; and
storing a status of the first request.

6. The method of claim 4, wherein the second wakeup corresponding to the speculative wakeup from the LD pipeline is triggered after storing the status of the first request.

7. The method of claim 5, wherein the second wakeup corresponding to the speculative wakeup from the LD pipeline is triggered after storing the status of the first request.

8. A non-transitory computer readable medium comprising a circuit representation that, when processed by a computer, is used to program or manufacture an integrated circuit comprising:
   a processor including circuitry configured to:
      initiate, before a Load-Store (LST) pipeline completes an execution of a load operation corresponding to a vector micro-operation (uop) dispatched to a baler issue queue, a respective load operation in a Load (LD) pipeline corresponding to the vector uop;
      trigger a speculative wakeup from the LD pipeline during an execution of the respective load operation;
      trigger a second wakeup corresponding to the speculative wakeup from the LD pipeline; and
      wake up, based on the second wakeup, the vector uop in the baler issue queue of the baler unit.

9. The non-transitory computer readable medium of claim 8, wherein:
   triggering the speculative wakeup from the LD pipeline occurs during the LDR stage.

10. The non-transitory computer readable medium of claim 8, wherein:
   the LD pipeline includes at least a LDR stage, a LDF stage, and a LDWB stage; and
   triggering the speculative wakeup from the LD pipeline occurs during the LDF stage.

11. The non-transitory computer readable medium of claim 9, wherein the processor is further configured to:
   transmit, from the baler unit, a first request to a physical readiness array (PRA) of a load transpose buffer of the baler unit to track a readiness of data derived from the execution of the respective load operation;
   not respond, by the PRA, to the first request; and
   store a status of the first request in an internal register of the processor.

12. The non-transitory computer readable medium of claim 10, wherein the processor is further configured to:
   transmit, from the baler unit, a first request to a physical readiness array (PRA) of a load transpose buffer of the baler unit to track a readiness of a data derived from the execution of the respective load operation; and
   not respond, by the PRA, to the first request; and
   store a status of the first request in an internal register of the processor.

13. The non-transitory computer readable medium of claim 11, wherein the second wakeup corresponding to the speculative wakeup from the LD pipeline is triggered after storing the status of the first request.

14. The non-transitory computer readable medium of claim 12, wherein the second wakeup corresponding to the speculative wakeup from the LD pipeline is triggered after storing the status of the first request.

15. The non-transitory computer readable medium of claim 12, wherein the processor is further configured to:
   generate an entry number from a claimed freelist such that a respective uop at LDR can index a corresponding Load Transpose Buffer (LTB) entry.

16. An integrated circuit comprising:
   a baler unit comprising a baler issue queue;
   a vector processing unit;
   a Load-Store unit (LSU) comprising a Load-Store (LST) pipeline and a Load (LD) pipeline; and
   a processor configured to:
      initiate, before a Load-Store (LST) pipeline completes an execution of a load operation corresponding to a vector micro-operation (uop) dispatched to a baler issue queue, a respective load operation in a Load (LD) pipeline corresponding to the vector uop;
      trigger a speculative wakeup from the LD pipeline during an execution of the respective load operation;
      trigger a second wakeup corresponding to the speculative wakeup from the LD pipeline; and
      wake up, based on the second wakeup, the vector micro-operation in the baler issue queue of the baler unit.

17. The integrated circuit of claim 16, wherein:
   the LD pipeline includes at least a load read (LDR) stage, a load forwarding (LDF) stage, and a load data write back (LDWB) stage; and
   triggering the speculative wakeup from the LD pipeline occurs during the LDR stage or the LDF stage.

18. The integrated circuit of claim 17, wherein:
   the baler unit further comprises a load transpose buffer that includes a physical readiness array (PRA);
   the processor is further configured to:
      transmit, from the baler unit, a first request to the PRA of the load transpose buffer of the baler unit to track a readiness of data derived from the execution of the respective load operation;
      not respond, by the PRA, to the first request; and
      store a status of the first request in an internal register of the processor.

19. The integrated circuit of claim 18, wherein the second wakeup corresponding to the speculative wakeup from the LD pipeline is triggered after storing the status of the first request.

20. The integrated circuit of claim 19, wherein the processor is further configured to:
   generate an entry number from a claimed freelist such that a respective uop at LDR can index a corresponding Load Transpose Buffer (LTB) entry.

* * * * *